UNITED STATES PATENT OFFICE.

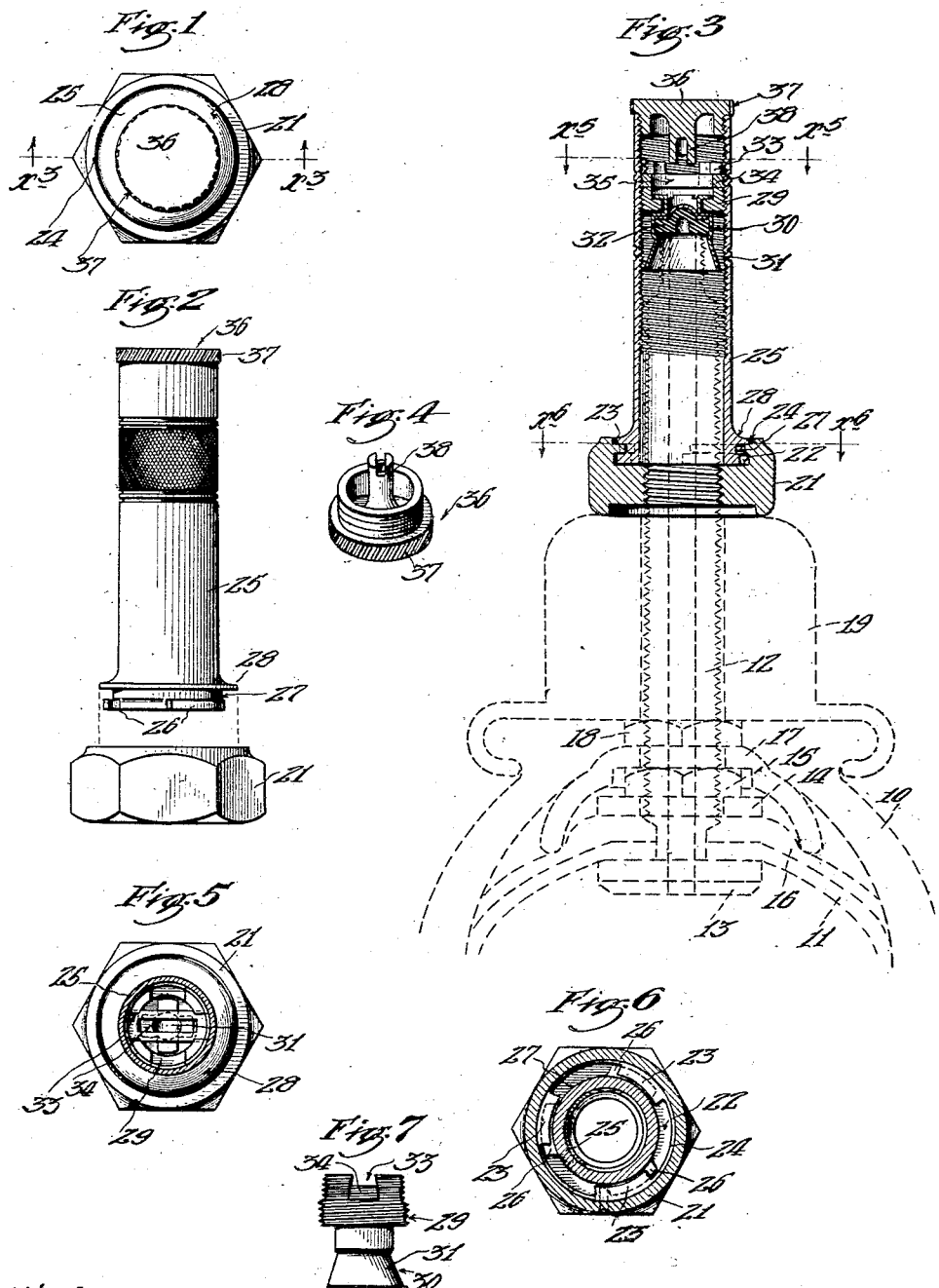

LEONARD C. WOELZ, OF LOS ANGELES, CALIFORNIA.

VALVE-STEM SHELL.

1,159,310.

Specification of Letters Patent.   Patented Nov. 2, 1915.

Application filed October 22, 1914.   Serial No. 868,132.

*To all whom it may concern:*

Be it known that I, LEONARD C. WOELZ, a citizen of the United States, residing at Los Angeles, in the county of Los Angeles and State of California, have invented a new and useful Valve-Stem Shell, of which the following is a specification.

The invention relates to pneumatic tires such as are commonly used on automobiles, bicycles and other vehicles.

The principal object of the invention is to provide means for protecting and closing the end of the valve stem used in such tires.

In the ordinary pneumatic tire a threaded valve stem is allowed to project through the felly of a wheel, being tightly secured therein by means of a nut. A cap is threaded on the end of this valve stem for the purpose of closing it and excluding dust, and a shell is also screwed on the valve stem completely covering and protecting the cap. The common practice is objectionable, first, on account of the fact that there is some liability of the shells working loose, and secondly, on account of the time required and the inconvenience of removing the shell and the cap for the purpose of reinflating or gaging the pressure in the tire. Moreover, this practice requires a small cap in addition to the shell, and there is great liability of this cap becoming lost especially where repairs are made on the road.

A further object of the invention is to provide a combined shell and cap, thereby doing away with the likelihood of losing any parts when making repairs.

A further object is to provide a combined shell and cap which can be easily and quickly attached and detached so that it will be a very easy matter to gage the pressure in the tire. This is very important as the life of tires is largely dependent on the maintenance of rated pressures therein, and the principal reason that these pressures are not maintained is due to the trouble and inconvenience of unscrewing the ordinary shell and cap and replacing them after the gage has been applied.

As the length of valve stem projecting through the felly of a wheel depends both on the length of stem and on the thickness of the felly, both of which are variable, it is necessary in the production of a commercial shell to so construct the shell that it can be readily adjusted to fit any commercial conditions, and a further object of my invention is to provide such a construction.

Some of the above objects and advantages have been disclosed in my application, Serial No. 819,107, filed February 16, 1914, for valve stem cap, of which this application is an improvement.

Further objects and advantages will be evident hereinafter.

Referring to the drawing which is for illustrative purposes only: Figure 1 is a plan view of the invention. Fig. 2 is an elevation of the shell and nut in a detached position. Fig. 3 is a section on the plane $x^3$—$x^3$ of Fig. 1. Fig. 4 is an inverted perspective view of the cover and wrench. Fig. 5 is a section on the plane $x^5$—$x^5$ of Fig. 3. Fig. 6 is a section on the plane $x^6$—$x^6$ of Fig. 3. Fig. 7 is a side elevation of the cap holder and cap removed from the invention.

In the drawings, the parts common to pneumatic tires at the present time are shown in dotted lines in Fig. 3. These parts are an outer casing 10, and an inner tube 11, which is secured to the bottom of the valve stem 12 by means of a washer 13, a washer 14 and a nut 15, suitable reinforcements being supplied as shown at 16. A guard plate 17 is clamped between the nut 15 and a nut 18. In my invention I employ a nut 21 which has a circular groove 22 in the top thereof and a series of segmental hooks 23 formed above this groove, a second groove 24 being formed above the hooks 23. A tube 25 of sufficient size and length to completely cover the valve stem 12 is provided with a series of segmental hooks 26 having a groove 27 formed therein, and a dust flange 28 formed above the groove 27. The shape of the segmental hooks 23 and 26 is such that the hooks 26 will pass through the spaces between the hooks 23 so that they may be thrown into engagement as shown in Fig. 6, the hooks 26 being rotated in the groove 22 and the hooks 23 being rotated in the groove 27, the flange 28 making a tight closure with the nut 21 in the groove 24. The interior of the tube 25 is threaded and a cap holder 29 is also threaded so that it may be rotated freely in the tube 25. Swiveled in the central opening in the cap holder 29 is a cap 30 which consists of a metal shell 31 and a rubber member 32. The cap holder 29 has wedge-shaped grooves 33 formed in the top thereof, and a slotted strip 34 is pushed into the slot 33 before the holder 29 is screwed into the tube 25, this slotted strip 34 being retained in the holder 29 by the tube 25. The slotted strip 34 has a slot 35 formed in the center thereof of sufficient size to take the end of an ordinary screw driver so that the holder 29 can be turned in the tube 25, thereby adjusting the axial position of the cap 30. A cover 36 is provided which is threaded so that it can be tightly secured in the end of the tube 25, a milled head 37 being formed thereon so that it can be readily manipulated. A wrench 38, suited to fit the valve of a standard tire, may be formed on the cover 36 as shown in Fig. 4.

The method of operation of the invention is as follows: The parts 10 to 12 being in place in the tire, the nut 21 is tightly screwed down against the felly of the wheel and the tube 25 is attached to the nut 21 by means of the hooks 26 and 23. The cover 36 is then removed from the tube 25 and a screw driver is inserted in the tube engaging the slot 35 by which the cap holder 29 is screwed down until the rubber member 32 of the cap 30 is pressed tightly against the end of the valve stem 12. Since the cap 30 is swiveled in the holder 29, it is evident that as soon as the rubber 32 engages the end of the stem 12 the cap will turn in the holder so that the rubber 32 is not worn by the valve stem when the shell is attached and detached from the nut 21. When the holder 29 has been suitably adjusted to cause a moderate pressure between the rubber 32 and the end of the valve stem 12, the screw driver is removed and the cover 36 is secured in place. The adjustable holder 29 is necessary as the valve stem 12 does not always project the same distance outside the felly 19 and it is necessary to make an adjustment of the axial position of the cap 30 with relation to the tube 25 for each particular length of valve stem. When this adjustment has been made it need not be changed unless the length of valve stem is varied, as will often be the case when a new inner tube is placed in an old casing. After this adjustment has been made the shell may be removed from the valve stem by a partial turn of the wrist and may be as easily replaced. The result is that the shell is perfectly retained by the friction caused by the pressure of the valve stem against the holder 29; but this shell can be instantly removed when it is desired to gage the pressure on the tire or to change the pressure thereof. This is further done by removing only a single member, the ordinary screw cap employed inside the ordinary guard being entirely dispensed with. It follows that automobile owners will keep a closer watch on their tires, thereby greatly lengthening the life thereof.

I claim as my invention:

1. A valve stem shell for pneumatic tires, comprising a nut adapted to be screwed on the valve stem of the tire, a tube detachably secured to said nut and surrounding the valve stem, a cap inside said tube, a cap holder secured and axially adjustable in said tube, means for securing said cap in said cap holder, and means for closing the outer end of said tube.

2. A valve stem shell for pneumatic tires, comprising a nut adapted to be screwed on the valve stem of the tire, a tube detachably secured to said nut and surrounding the valve stem, a cap inside said tube, a cap holder secured and axially adjustable in said tube, means for securing said cap in said cap holder in such a manner that said cap can turn freely, and means for closing the outer end of said tube.

3. A valve stem shell for pneumatic tires, comprising a nut adapted to be screwed on the valve stem of the tire, a tube detachably secured to said nut and surrounding the valve stem, a cap inside said tube, a cap holder having a slot in the top thereof, a slotted strip placed in said slot, and means for securing said cap in said holder in such a manner that said cap is free to turn freely in said holder.

4. A valve stem shell for pneumatic tires, comprising a nut adapted to be screwed on the valve stem of the tire, a tube detachably secured to said nut and surrounding the valve stem, a cap inside said tube, a cap holder having a slot in the top thereof, a slotted strip placed in said slot, means for closing the outer end of said tube, and means for securing said cap in said holder in such a manner that said cap is free to turn freely in said holder.

5. A valve stem shell comprising a nut adapted to be screwed on the valve stem of a pneumatic tire, a tube surrounding said stem and detachably secured to said nut, means for closing the outer end of said tube, a cap inside said tube, and means adjustably secured in said tube for forcing said cap against the end of the valve stem, said adjustable means being so connected to said cap that the cap is free to rotate.

6. A valve stem shell for pneumatic tires, comprising a nut adapted to be screwed on the valve stem of the tire, a tube detachably secured to said nut and surrounding the valve stem, a cap inside said tube, a cap holder secured and axially adjustable in said tube, and means for securing said cap in said cap holder.

7. A valve stem shell for pneumatic tires, comprising a nut adapted to be screwed on the valve stem of the tire, a tube detachably secured to said nut and surrounding the valve stem, a cap inside said tube, a cap holder secured and axially adjustable in said tube, and means for securing said cap in said cap holder in such a manner that said cap can turn freely.

8. A valve stem shell comprising a nut adapted to be screwed on the valve stem of a pneumatic tire, a tube surrounding said stem and detachably secured to said nut, a cap inside said tube, and means adjustably secured in said tube for forcing said cap against the end of the valve stem, said adjustable means being so connected to said cap that the cap is free to rotate.

In testimony whereof, I have hereunto set my hand at Los Angeles, California, this 15th day of October, 1914.

LEONARD C. WOELZ.

In presence of—
FRED A. MANSFIELD,
FORD W. HARRIS.